United States Patent
Alla et al.

(10) Patent No.: US 11,155,220 B2
(45) Date of Patent: Oct. 26, 2021

(54) HOLDER ARRANGEMENT COMPRISING A BRACKET AND A SPACER, AND A MANUFACTURING METHOD FOR MANUFACTURING A SPACER

(71) Applicant: VOLVO TRUCK CORPORATION, Gothenburg (SE)

(72) Inventors: Anantha Rama Krishna Lakshmi Narayana Alla, Bangalore (IN); Benoy Thomas, Bangalore (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/761,025

(22) PCT Filed: Jan. 21, 2019

(86) PCT No.: PCT/EP2019/051363
§ 371 (c)(1),
(2) Date: May 1, 2020

(87) PCT Pub. No.: WO2019/141843
PCT Pub. Date: Jul. 25, 2019

(65) Prior Publication Data
US 2021/0178992 A1 Jun. 17, 2021

(30) Foreign Application Priority Data
Jan. 2, 2018 (IN) .............................. 201841000132

(51) Int. Cl.
*H02G 3/32* (2006.01)
*B60R 16/02* (2006.01)

(52) U.S. Cl.
CPC ........... *B60R 16/0215* (2013.01); *H02G 3/32* (2013.01)

(58) Field of Classification Search
CPC ........ B60R 16/0215; F16B 7/20; F16B 21/04; F16B 2200/20
(Continued)

(56) References Cited

U.S. PATENT DOCUMENTS 5,219,134 A * 6/1993 Morita ..................... H02G 3/26
248/224.7
7,568,871 B2 * 8/2009 Chopp, Jr. ............ F16B 5/0275
411/389

(Continued)

FOREIGN PATENT DOCUMENTS

| DE | 102015121271 B3 | 4/2017 |
| EP | 1772935 A2 | 4/2007 |
| WO | 2012120321 A1 | 9/2012 |

OTHER PUBLICATIONS

International Search Report and Written Opinion dated Apr. 1, 2019 in corresponding International PCT Application No. PCT/EP2019/051363, 9 pages.

*Primary Examiner* — Timothy J Thompson
*Assistant Examiner* — Michael F McAllister
(74) *Attorney, Agent, or Firm* — Venable LLP; Jeffri A. Kaminski (57) ABSTRACT

The invention relates to a holder arrangement (1, 101) for holding a cable (3, 3') or the like to a support structure (5, 5'). The holder arrangement comprises a spacer (10, 110, 210) being configured for attachment to the support structure, and a bracket (20, 120, 220) comprising a cable supporting portion (22, 122, 222) and a spacer receiving portion (24, 124, 224) having a spacer receiving volume (26, 226) for holding the spacer. The spacer receiving portion comprises an inner wall (28) which is provided with a bracket axial locking arrangement (32) and a bracket rotational locking arrangement (30), configured for mating with corresponding spacer axial locking arrangement (16) and (Continued)

spacer rotational locking arrangement (14), to axially lock the bracket in relation to the spacer, and to rotationally lock the bracket in relation to the spacer, respectively. The internal wall further comprises a bracket load transferring surface (34) being distant from the bracket rotational locking arrangement, for transferring loads from the bracket to the spacer to avoid, or reduce, unintentional movement of the bracket relative the spacer.

15 Claims, 9 Drawing Sheets (58) Field of Classification Search
USPC .................................................... 174/72 A
See application file for complete search history.

(56) References Cited

U.S. PATENT DOCUMENTS

| | | | |
|---|---|---|---|
| 9,562,626 B2 * | 2/2017 | Gustin | F16L 3/127 |
| 9,784,298 B2 * | 10/2017 | Weatherl | F16B 39/24 |
| 10,250,024 B2 * | 4/2019 | Eyles | H02G 3/32 |
| 2004/0106309 A1 * | 6/2004 | Larsson | H01R 4/66 |
| | | | 439/92 |
| 2013/0160246 A1 | 6/2013 | Hajduch | |
| 2018/0128299 A1 * | 5/2018 | Katabira | F16B 13/0833 |
| 2018/0172182 A1 * | 6/2018 | Matz | F16L 3/127 |

* cited by examiner

HOLDER ARRANGEMENT COMPRISING A BRACKET AND A SPACER, AND A MANUFACTURING METHOD FOR MANUFACTURING A SPACER

CROSS-REFERENCE TO RELATED APPLICATIONS

This patent application claims the priority to Indian Provisional Application No. 201841000132, filed Jan. 2, 2018 and U.S. National Stage application of PCT/EP2019/051363, filed Jan. 21, 2019 and published on Jul. 25, 2019 as WO 2019/141843 A1, all of which is hereby incorporated by reference in its entirety.

TECHNICAL FIELD

The invention relates to the field of holder arrangements for cables and the like, for example holding arrangements used for holding and securing cables and the like in a vehicle, such as e.g. trucks, buses and construction equipment, e.g. wheel loaders, articulated haulers, excavators and backhoe loaders. The holder arrangement may also be used for general holding purposes in another technical filed. The invention also relates to the manufacturing of a spacer comprised in such holding arrangement.

BACKGROUND

Holder arrangements for holding cables and the like are used in various industries and are employed in e.g. vehicles, in machinery, for duct work, and other applications. A holder arrangement is typically configured to provide attachment for a cable or any elongated member such as e.g. a wire, a tube, a pipe, a hose, a conduit, or any other similar cable-like structure, to some support structure. Typically, the holder arrangement is configured for attaching a plurality of cables or the like, such as e.g. a bundle of cables or other elongated members. One main advantage of using a holder arrangement for attaching cables or the like to a support structure, is that the cables may be desirably arranged, and may be positioned not to be in the way of, or to interfere with, operation of the application for which the cables are used. For example, cables which are not securely held to the support structure may become loose and may interfere with the operation of the application, or may be caught by a moving part and be cut off causing risk of damages to both personnel and the application for which the cables are used.

Furthermore, many applications using cables or the like are associated with space constraints which makes it desirable to arrange and position the cables in a certain way. The final desired arrangement and position of the cables may furthermore be apparent first during the cable routing, which may be carried out upon final assembly of the application. EP 1 772 935 discloses a holder arrangement for cables and the like having a plug connector which is received in a base part, which holder arrangement can be rotationally positioned in a desired way, and which can be locked in such position.

However, the holder arrangement in EP 1 772 935 has some drawbacks, for example, assembly of the holder arrangement to a support structure is relatively complex as the base part is to be received in a hole of the support structure, and the rotational position of the plug connector may unintentionally be change, as the application of an external load to the cable or plug connector may result in a force within the holder arrangement causing the plug connector to be unlocked relative the base part. Furthermore, the holder arrangement in EP 1 772 935 is relatively complex and difficult to manufacture.

Accordingly, it is desirable to provide a holder arrangement that is easy to handle and easy to manufacture, and that can be attached to a support structure for holding and securing a cable or the like in a desired manner.

SUMMARY

In view of the above-mentioned and other drawbacks of the prior art, the object of the present inventive concept is to provide a holder arrangement which at least partly alleviates the drawbacks of the prior art. According to a first aspect of the invention, the object is achieved by a holder arrangement according to claim 1.

The present invention is based on the insight that a holder arrangement which is configured to hold cables and the like in a certain position relative a support structure, can be arranged and configured to transfer induced forces by an applied external load to the holder arrangement, from the holder arrangement to the support structure, in such a way that unintentional relative movement between holder arrangement and the support structure, or within separate parts of the holder arrangement, is avoided or at least where the risk of such unintentional movement is minimized. More specifically, the present invention is based on the insight that the holder arrangement can comprise at least two separate parts, a bracket for supporting the cable, and a spacer which is configured to rotationally position the bracket in relation to said support structure. By providing the bracket with at least one separate load transferring surface being functionally and structurally separate from any rotational or axial locking arrangement, the risk of unintentional movement between the spacer and the bracket is minimized, or at is least reduced compared to prior art solutions.

According to the first aspect of the invention, a holder arrangement for holding a cable or the like to a support structure is provided. The holder arrangement comprises:

a spacer being configured for attachment to said support structure, and a bracket comprising a cable supporting portion configured to support the cable, and a spacer receiving portion having a spacer receiving volume for holding said spacer, said spacer receiving portion comprising an inner wall facing said spacer receiving volume and is provided with a bracket axial locking arrangement and a bracket rotational locking arrangement, wherein said spacer comprises an outer wall being provided with corresponding spacer axial locking arrangement and spacer rotational locking arrangement, and wherein when said spacer is received in said spacer receiving volume, said bracket axial locking arrangement is configured to mate with said spacer axial locking arrangement to axially lock said bracket in relation to said spacer, and said bracket rotational locking arrangement is configured to mate with said spacer rotational locking arrangement to rotationally lock said bracket in relation to said spacer, such that said bracket can be rotationally positioned in relation to said support structure by means of said spacer, wherein said internal wall further comprises a bracket load transferring surface being distant from said bracket rotational locking arrangement, wherein when said spacer is received in said spacer receiving volume, said bracket load transferring surface is in contact with the outer wall of said spacer for transferring loads from said bracket to said spacer to avoid unintentional movement of said bracket relative said spacer.

By the provision of a holder arrangement having a bracket load transferring surface being distant from said bracket rotational locking arrangement, unintentional movement between the bracket and the spacer, e.g. due to the application of an external load on the bracket, can be reduced or even avoided, as the applied external load will propagate through the bracket, and over to the spacer, at least via the bracket load transferring surface. According to at least one example embodiment, the bracket load transferring surface is also distant from said bracket axial locking arrangement. Hence, for example, the bracket rotational locking arrangement which mates with the spacer rotational locking arrangement, and/or the bracket axial locking arrangement which mates with the spacer axial locking arrangement, when the spacer is received in the spacer receiving volume of the bracket, need not to transfer the whole load from the bracket to the spacer, which otherwise could lead to such stress that the bracket and the spacer disengages from each other. In other words, for a holder arrangement having no bracket load transferring surface being distant from the bracket rotational locking arrangement, and for which the load is transferred to a larger extent via the bracket rotational locking arrangement and/or the bracket axial locking arrangement, the risk of causing the bracket to unintentional move, e.g. rotate, relative the spacer is larger. Thus, the unintentional movement which is avoided, or which has a reduced risk of occur, may be an unintentional rotational movement.

Stated differently, the holder arrangement is, and the spacer and the bracket are, arranged such that the bracket load transferring surface is functionally and structurally separated from at least said rotational locking arrangement, and possibly also functionally and structurally separated from said axial locking arrangement.

It should be understood that, when said spacer is received in said spacer receiving volume of said bracket, the bracket load transferring surface is in contact with the spacer, or more specifically a portion of the outer wall of the spacer, such as e.g. a portion of the spacer rotational locking arrangement of said spacer. Hereby, forces, or moment, stemming from said external load, can be transferred from the bracket to the spacer via the bracket load transferring surface which is distant from the bracket rotational locking arrangement, and possibly also distant from the bracket axial locking arrangement. It should be noted when referring to that an external load is applied to the bracket, forces or moment (or induced forces or induced moments), or a combination of the two, are typically transferred in the bracket and further to the spacer. Such phenomena may in the application text simple be referred to as a load transfer within the bracket, and from the bracket to the spacer. Naturally, the applied load is further transferred to the support structure via the spacer and any fastener used to fasten the spacer to the support structure.

According to at least one example embodiment, the spacer is sized and dimensioned to snuggly, or tightly, fit inside the spacer receiving volume of the bracket. According to at least one example embodiment, the spacer is sized and dimensioned such that at least a portion of the outer wall of said spacer is in contact with the bracket load transferring surface when said spacer is received in said spacer receiving volume. According to at least one example embodiment, the spacer is in use arranged at least partly between said bracket and said support structure.

It should be noted that the holder arrangement, or more specifically the cable supporting portion of the bracket, is suitable for holding a cable or any elongated member such as e.g. a wire, a tube, a pipe, a hose, a conduit, or any other similar cable-like structure. The holder arrangement may further be configured to hold a plurality of such elongated members, i.e. for example a bundle of cables or the like. The cable supporting portion may e.g. comprise openings for receiving and holding the cable or the like, or may comprise an attachment structure for receiving an attachment, such as e.g. a clamping stripe, which is used to hold and secure the cable or the like. Moreover, it should be noted that the holder arrangement, and more specifically, the spacer is configured for attachment to a support structure, wherein the support structure may be comprised in a wall portion, or a support element, to which the holder arrangement is to be mounted. In other words, said support structure may be referred to as a wall portion or a support element or a support wall portion.

According to at least one example embodiment, the bracket axial locking arrangement and the spacer axial locking arrangement, which axially lock the bracket in relation to the spacer may be referred to as an axial locking arrangement, or axial locking structure, of the holder arrangement. Correspondingly, the bracket rotational locking arrangement and the spacer rotational locking arrangement, which rotationally lock the bracket in relation to the spacer may be referred to as a rotational locking arrangement, or rotational locking structure, of the holder arrangement. The axial locking arrangement may be configured to be uni-directional, i.e. that the spacer is axially locked to the bracket in a positive direction along the axial axis of the holder arrangement, and in a direction opposite the positive direction of the axial axis, i.e. in a negative direction along the axial axis of the holder arrangement. Correspondingly, the rotational locking arrangement is typically configured to be uni-directional, i.e. that the spacer is rotationally locked to the bracket in a first rotational direction, and in second rotational direction being opposite to said first rotational direction. Hereby, the bracket can be axially locked and/or rotationally locked to the spacer subsequently to attaching the spacer to the support structure, and thus assembly of the spacer and the bracket may be located to different positons along an assembly line of the bracket to the support structure.

Alternatively, the axial locking arrangement may be configured to be bi-directional so that the spacer may be received into the bracket from both directions. This may reduce the time needed to handle and mount each spacer.

It should be understood that the holder arrangement may be described in relation to a coordinate system, e.g. a cylindrical coordinate system, in which the holder arrangement has a main extension in the axial direction, i.e. along the axial axis, and wherein the holder arrangement has an extension in the radial direction, i.e. along a radial axis being perpendicular to said axial axis.

According to at least one example embodiment, said spacer rotational locking arrangement comprises axial spacer ridges arranged along an axial direction of the spacer, and said bracket rotational locking arrangement comprises at least one axial bracket ridge adapted to mate with said axial spacer ridges.

Hereby, a relatively easy by yet effective means for enabling said rotational locking between the bracket and the spacer is provided. It should be understood that the axial direction of the spacer corresponds to the extension of the spacer along the axial axis of the holder arrangement, and that the spacer may be described in relation to cylindrical coordinates in which the spacer further has an extension in the radial direction, and along a circumferential direction. Correspondingly, at least the spacer receiving portion of the bracket, and the inner wall may be described in relation to cylindrical coordinates in which the inner wall has an extension in the axial direction, and surrounds the spacer receiving volume along a circumferential direction.

The axial spacer ridges may be arranged in the axial direction of the spacer over, or along, at least a portion of the outer circumference of the spacer, or over the whole outer circumference of the spacer. The axial spacer ridges are typically arranged in the outer wall of the spacer. Described differently, the outer wall of the spacer is comprised of the axial spacer ridges. The axial spacer ridges may be referred to as spacer threads or spacer teeth. Hence the axial spacer ridges may be repeatedly and alternately arranged along a portion of, or the entire, circumference of the outer wall. Stated differently, two neighbouring axial spacer ridges are separated by an axial spacer groove, and the axial spacer ridges and axial spacer grooves are alternately and repeatedly arranged along a portion of the, or the entire, circumference of the outer wall. By having the axial spacer ridges provided along the entire circumference of the outer wall, the rotational locking of the bracket and the spacer is activated as soon as the spacer is received in the spacer receiving volume of the bracket, regardless of direction of application.

Correspondingly, the at least one axial bracket ridge may be arranged in the axial direction of the inner wall, and in embodiments having more than one axial bracket ridge be arranged over, or along, at least a portion of the circumference of the inner wall. Any axial bracket ridge is typically arranged in the inner wall of the spacer receiving portion. Described differently, the inner wall of the spacer receiving portion is comprised of the axial bracket ridge(s). Any axial bracket ridge may be referred to as a bracket thread or a plurality of axial bracket ridges may be referred to as bracket threads or bracket teeth. Hence, axial bracket ridges may be repeatedly and alternately arranged along a portion of, or along different portions of, the circumference of the inner wall. Stated differently, each one of at least two distant portions of the inner wall may be provided with at least one axial bracket ridge, or at least two axial bracket ridges separated by an axial bracket groove, and each one of these portions may be adapted to mate with the axial spacer ridges and axial spacer grooves of the outer wall of the spacer.

It should be understood that when stating that said at least one axial bracket ridge is adapted to mate with said axial spacer ridges, the at least one axial bracket ridge is typically arranged to mate with an axially spacer groove arranged between the axial spacer ridges.

According to at least one example embodiment, at least one of said axial spacer ridges have a flat top, enabling a relative large contact surface area with said bracket load transferring surface.

Hereby, the load transferring (e.g. the transfer of forces or moment) via the bracket load transferring surface may be improved and/or increased. According to at least one example embodiment, at least a plurality of, such as e.g. each one of, said axial spacer ridges have a flat top, enabling a relative large contact surface area with said bracket load transferring surface.

Such flat top of an axial spacer ridge may still be configured to mate with the bracket rotational locking arrangement, and may thus be sized and dimensioned not to negatively interfere with the bracket rotational locking arrangement, such as axial bracket ridge(s). However, it should be noted that any axial spacer ridge having a flat top typically has the same, or substantially the same, radial extension as a corresponding axial spacer ridge having no flat top. More specifically, a center portion of the flat top may have the same radial extension as the top of a ridge for an axial spacer ridge having no flat top. The flat top may e.g. have a width of between 0.1 mm and 5 mm, such as e.g. between 0.5 mm and 2 mm. However, the width of the flat top may be larger than 2 mm depending on the arrangement, and the number of axial spacer ridges. For example, the axial spacer ridges may be four, and may thus be angled to each other by 90°, or may be eight and angled to each other by 45°. For such configurations, the flat top has a width which is typically larger than 2 mm. According to at least one example embodiment, the top of at least one the axial spacer ridges are rounded or top-shaped.

According to at least one example embodiment, said spacer axial locking arrangement comprises a circumferentially arranged groove, and said bracket axial locking arrangement comprises a protrusion adapted to be snap-locked into said circumferentially arranged groove.

Hereby, a simple but yet effective way of providing the axial locking arrangement is provided. The circumferentially arranged groove may e.g. be arranged along the whole outer circumference of the spacer. Hereby, rotational movement of the bracket relative the spacer is not hindered by the axial locking arrangement, as the protrusion of the bracket may be held in said circumferentially arranged groove and may thus move freely in the circumferential direction. The circumferentially arranged groove is typically arranged in the outer wall of the spacer. Described differently, the outer wall of the spacer is comprised at least partly of an internal surface of said circumferentially arranged groove. The circumferentially arranged groove may for example be arranged somewhere between a top portion, or top side, of the spacer, and a bottom portion, or bottom side, of the spacer. Hereby, the circumferentially arranged groove may be configured to uni-axial lock the bracket to the spacer in the axial direction. The circumferentially arranged groove may for example be arranged as an interruption of the axial spacer ridges, such that each axial spacer ridge is divided into at least two portions, one portion above, and one portion below, said circumferentially arranged groove. According to at least one example embodiment, the circumferentially arranged groove may be arranged adjacent one of the top portion/side and bottom portion/side. Alternatively, the circumferentially arranged groove may be arranged centrally between the top portion/side and bottom portion/side with a corresponding arrangement of the protrusion so that the axial locking arrangement may become bi-directional. According to at least one example embodiment, the circumferentially arranged groove is comprised in one of the top portion/side and bottom portion/side.

According to at least one example embodiment, said inner wall of said spacer receiving portion is circumferentially divided between a first wall portion type comprising said bracket rotational locking arrangement, and a second wall portion type comprising said bracket load transferring surface, and wherein said first and second wall portion types are alternately and repeatedly arranged along the entire circumference of the inner wall.

Hereby, the bracket rotational locking arrangement is distant, and separated from the bracket load transferring surface, and load may be transferred between the bracket and the spacer, such as between the inner wall portion of the spacer receiving portion and the outer wall of the spacer, at least as a complement to load transfer via the rotational locking arrangement. Hence, the first wall portion type is different from, and separate from, said second wall portion type.

According to at least one example embodiment, said inner wall of said spacer receiving portion is further circumferentially divided in a third wall portion type comprising said bracket axial locking arrangement, wherein said first, second and third wall portion types are alternately and repeatedly arranged along the entire circumference of the inner wall.

Hereby, also the bracket axial locking arrangement is distant, and separated from the bracket load transferring surface, and load may be transferred between the bracket and the spacer, such as between the inner wall portion of the spacer receiving portion and the outer wall of the spacer, at least as a complement to load transfer via the rotational and axial locking arrangement.

According to at least one example embodiment, the bracket axial locking arrangement is arranged as protruding portion from said bracket load transferring surface. Hence, the third wall portion type may be surrounded by said second wall portion type.

According to at least one example embodiment, said spacer has a uniform extension along the axial direction of the spacer, e.g. by being cylindrically shaped.

Hereby, a simple but yet appropriate shape of the spacer is provided. In other words, the outer radial outer boundary defined by e.g. the top of the axial spacer ridges, is uniform along the axial direction of the spacer. The spacer may for example be shaped as a cylinder, i.e. having a flat first side extending in the radial direction, said first side being e.g. the top portion or the top side of the spacer, and having a flat second side extending in the radial direction, said second side being axially distant from said first side, and said second side being e.g. the bottom portion or bottom side of the spacer, wherein the first side and the second side are connected to each other by said outer wall of the spacer, said outer wall being a lateral wall. Thus, the axial spacer ridges may be formed in said lateral wall of said spacer.

A spacer having a uniform extension along the axial direction, such as e.g. a cylindrically shaped spacer, is relatively easy to manufacture. Thus, a relatively complex shape of the spacer can be avoided, while still providing for a structure enabling the axial and rotational locking to the bracket, and the manufacturing cost of the spacer can be reduced.

According to at least one example embodiment, said spacer is manufactured by an extrusion process.

Hereby, a cheap and appropriate manufacturing method may be used to produce the spacer. Moreover, said spacer rotational locking arrangement, and said spacer axial locking arrangement are relatively easy to provide to said spacer by the extrusion process. For example, in embodiments in which the spacer rotational locking arrangement comprises axial spacer ridges, the extrusion tool may be provided with a corresponding structure such that said axial spacer ridges are formed in the outer surface of the spacer during the extrusion process. Correspondingly, the extrusion tool may be provided with a structure such that said spacer axial locking arrangement are formed in the outer surface of the spacer during the extrusion process. Alternatively, the spacer rotational locking arrangement and/or the spacer axial locking arrangement, such as the axial spacer ridges and/or the circumferentially arranged groove, respectively, may be formed in the spacer subsequent to said extrusion process. For such embodiments, the extrusion process is used to manufacture a spacer having the correct size and dimension, while any processing for providing the spacer rotational locking arrangement and/or spacer axial locking arrangement in said spacer is carried out after the extrusion process.

According to at least one example embodiment, at least said spacer receiving portion is made out of plastic.

Hereby, the spacer receiving portion is made flexible, thus allowing the spacer to be moved inside said spacer receiving volume, even though the spacer is sized and dimensioned to snuggly, or tightly, fit inside said spacer receiving volume of the bracket. Preferably, the bracket rotational locking arrangement is flexibly arranged, and is for example able to deflect upon the application of a certain threshold load, such as e.g. an intentional rotational force applied to the bracket and made in order to intentional rotate the bracket relative the spacer, even when the spacer is received in said spacer receiving volume. For example, for embodiments in which the bracket rotational locking arrangement comprises at least one axial bracket ridge, the spacer receiving portion may be provided with a gap or a through hole adjacent, and radially outwards of, said axial bracket ridge. The gap or through hole is typically shaped and dimensioned to receive and at least partly house or hold said axial bracket ridge. Hereby, the axial bracket ridge may be moved radially outwards, and towards or into said gap or through hole upon the application of a certain threshold load, such as e.g. an intentional rotational force applied to the bracket and made in order to intentional rotate the bracket relative the spacer, even when the spacer is received in said spacer receiving volume.

According to at least one example embodiment, the spacer receiving portion is flexible, or at least the rotational locking arrangement is flexible. Thus, as explained above, the bracket may be forcefully rotated even when the spacer is received in said spacer receiving volume. Thus, by having said spacer receiving portion made out of plastic, and thus being flexible, an intentional movement of the bracket in relation to said spacer may be carried out, even when the spacer is received in said spacer receiving volume. For example, the bracket rotational locking arrangement, such as any axial bracket ridge(s), may be made out of plastic and may thus be flexible. Thus, by forcibly applying a force to rotate the bracket in relation to the spacer, the axial bracket ridge(s) will deflect, for example into said gap or through hole, when encountering the axial spacer ridges which is held in positon relative the support structure by e.g. a fastener, and thus, the bracket may be intentional rotated relative the spacer and the support structure. Thus, said bracket can be rotationally positioned in relation to said support structure even after assembly of the bracket to the spacer.

According to at least one example embodiment, said spacer comprises a spacer through hole configured for receiving a fastener, such as e.g. the elongated body of a bolt, for attachment to said support structure, and wherein said spacer receiving volume of said spacer receiving portion is a through hole enabling access to said spacer when said spacer is received in said spacer receiving volume.

Hereby, a top portion of the spacer, such as e.g. the flat first side of the spacer, may be access even after assembly of the bracket to the spacer. Thus, any fastener used to secure the spacer to the support structure may be accessed even after assembly of the bracket to the spacer. Hereby, the spacer can be loosened or more tightly fixed to the support structure by adjusting the fastener. Moreover, by enabling access to the spacer, such as the top side of the spacer, after assembly of the bracket to the spacer, an additional spacer can be stacked on top of said spacer, and possibly secured to the support structure by the same fastener (further elaborated below).

Moreover, by providing a bracket with a spacer receiving portion which is formed as a through hole enabling access to said spacer when said spacer is received in said spacer receiving volume, the bracket and the spacer can be pre-assembled prior to attaching or securing the holder arrangement to the support structure by using e.g. a fastener. In other words, access to said spacer, when said spacer is received in said spacer receiving volume, provides a possibility for the fastener to attach the spacer to the support structure even when the bracket is assembled to said spacer.

According to at least one example embodiment, said spacer comprises a first side, such as e.g. said flat first side, perpendicularly arranged to said spacer through hole, said first side having a fastener contacting surface which, in use, is configured as a counter holding surface for said fastener, such as e.g. the bolt head of a bolt, wherein said fastener contacting surface has a smaller radial extension compared to a radial extension of said spacer receiving volume, such that the bracket can attached to said spacer, subsequently to fastening said spacer to said support structure by means of said fastener.

By having fastener contacting surface of the spacer which is smaller compared to the spacer receiving volume, a fastener having a corresponding spacer contacting surface to said fastener contacting surface, can be used to attach or secure the spacer to the support structure, prior to assembly of the bracket to the spacer. In other words, the bracket may be applied to the spacer, wherein said spacer is attached or secured to the support structure by the fastener, as the spacer receiving volume is sized and dimensioned to hold the spacer, and a fastener in contact with the fastener contacting surface.

According to at least one example embodiment, said through hole of said spacer receiving portion enables access to said first side, being e.g. a top side, of the spacer, when said spacer is received in said spacer receiving volume. Thus, the first side, and said fastener contacting surface, may be accessed even when said spacer is received in said spacer receiving volume.

According to at least one example embodiment, said spacer is a first spacer and said bracket is a first bracket, and said holder arrangement further comprises:

a second spacer configured for attachment to said support structure, said second spacer being equal, or substantially equal, to said first spacer, and a second bracket having a cable supporting portion configured to support a cable, and a spacer receiving portion having a spacer receiving volume for holding said second spacer, said spacer receiving portion of said second bracket being equal, or substantially equal, to the spacer receiving portion of said first bracket, wherein, in use, the first and the second spacers can be stacked on top of each other such that the spacer through holes align and thus enabling fastening of the first and the second spacers to the wall portion by the same fastener.

By the provision of having a spacer receiving volume of the first bracket formed as a through-hole, the first side, such as a top side, of the first spacer can be accessed even after assembly of the first bracket to the first spacer, and thus a second spacer can be arranged adjacent to the first spacer, said second spacer being configured to hold said second bracket. Hereby, more than one bracket can be attached to the support structure using only one fastener. According to at least one example embodiment, a further spacer and a corresponding further bracket can be comprised in said holder arrangement, said further spacer being stacked on said second spacer.

Effects and features of the second spacer and the second bracket are largely analogous to those described above in connection with the first spacer and the first bracket, respectively. Embodiments mentioned in relation to the first spacer and the first bracket are largely compatible the second spacer and the second bracket, respectively.

According to at least a second aspect of the invention, the object is achieved by a vehicle according to claim 12. More specifically, the invention relates to a vehicle comprising a support structure, and a holder arrangement in accordance with the first aspect of the invention. The holder arrangement is attached to said support structure.

Thus, the holder arrangement may be configured to withstand unintentional movement of said bracket relative said spacer which originates from e.g. vibrations caused by a movement of said vehicle.

According to at least a third aspect of the invention, the object is achieved by a method for manufacturing a spacer being configured for attachment to a support structure, and being configured for mating with a bracket such that said bracket can be rotationally positioned in relation to said wall portion by means of said spacer. The method comprises the steps of:

forming said spacer in an extrusion process into a cylindrical shape having an outer wall comprising axial spacer ridges arranged along an axial direction of the spacer, said axial spacer ridges being configured to mate with a corresponding axial bracket ridge of said bracket.

Hereby, a cheap and appropriate manufacturing method may be used to produce the spacer. Hence, the extrusion tool may be provided with a structure enabling said axial spacer ridges to be formed in the outer wall of the spacer during the extrusion process. Further effects and features of this embodiment are analogous to the corresponding embodiment of the first aspect of the present invention and are not repeated again here.

According to at least one example embodiment, the method comprises the step of: forming a flat top of at least one of the axial spacer ridges enabling a relative large contact surface area with a bracket load transferring surface of said bracket.

Hereby, the load transferring (e.g. the transfer of forces or moment) via the bracket to the spacer may be improved and/or increased. According to at least one example embodiment, at least a plurality of, such as e.g. each one of, said axial spacer ridges are formed to have a flat top, enabling a relative large contact surface area with said bracket load transferring surface. Further effects and features of this embodiment are analogous to the corresponding embodiment of the first aspect of the present invention and are not repeated again here.

According to at least one example embodiment, the method further comprises the step of: forming a circumferentially arranged groove in said outer wall, said circumferentially arranged groove being configured to mate with a corresponding snap-lock of said bracket.

Correspondingly, the extrusion tool may be provided with a structure enabling said circumferentially arranged groove to be formed in the outer wall of the spacer during the extrusion process. Further effects and features of this embodiment are analogous to the corresponding embodiment of the first aspect of the present invention and are not repeated again here.

According to at least one alternative example embodiment, the spacer rotational locking arrangement, i.e. here the axial spacer ridges and/or the spacer axial locking arrangement, i.e. here circumferentially arranged groove, may be formed in the spacer subsequent to said extrusion process. For such embodiments, the extrusion process is used to manufacture a spacer having the correct size and dimension, while any processing for providing the spacer rotational locking arrangement and/or spacer axial locking arrangement in said spacer is carried out after the extrusion process.

According to at least one example embodiment, the spacer is made of plastic or metal.

Further advantages and advantageous features of the invention are disclosed in the following description and in the dependent claims.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which an exemplary embodiment of the invention is shown. The invention may, however, be embodied in many different forms and should not be construed as limited to the embodiment set forth herein; rather, the embodiment is provided for thoroughness and completeness. Like reference character refer to like elements throughout the description.

Figure 1:
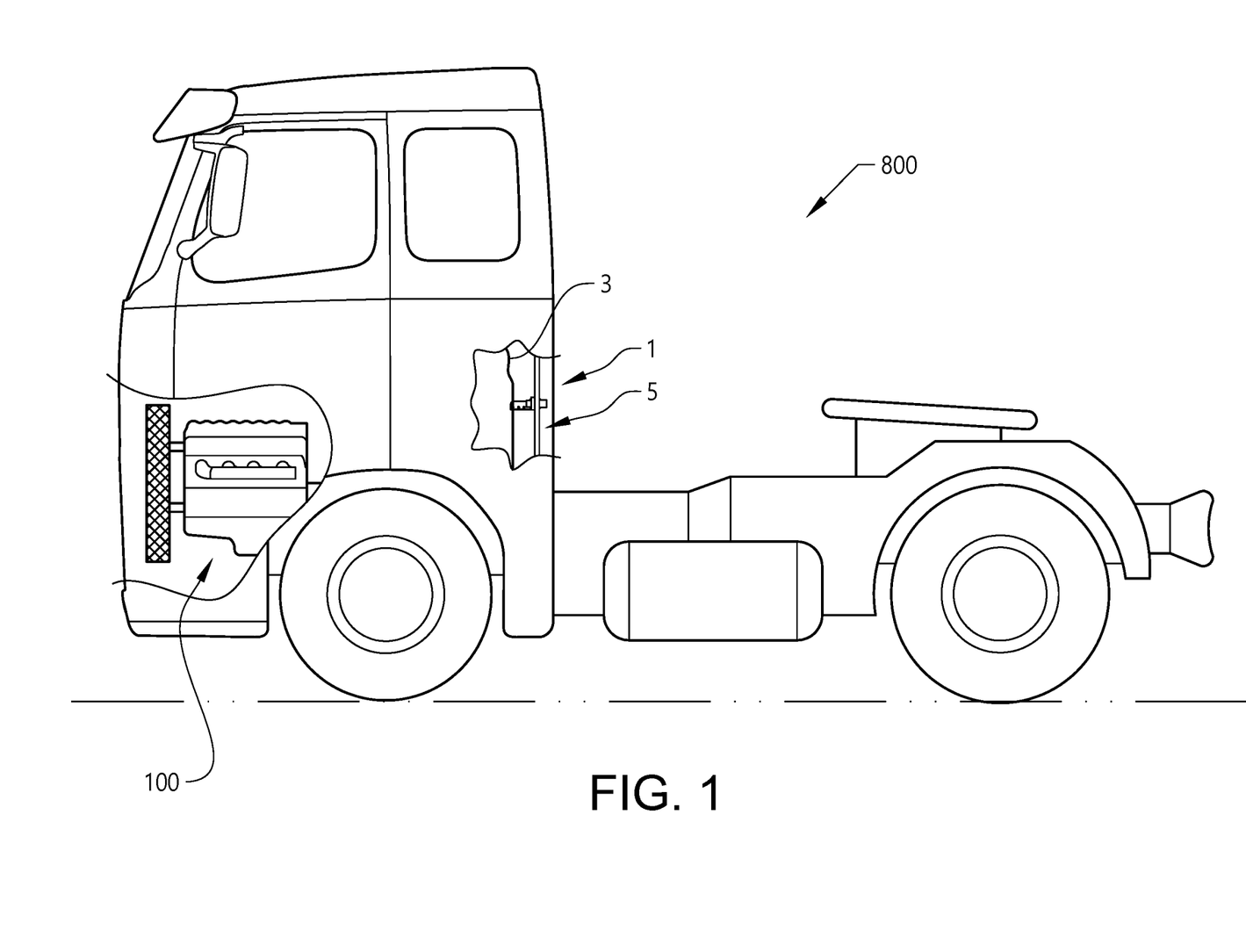
FIG. 1 is a side view of a vehicle comprising a holder arrangement attached to a support structure within the vehicle according to an example embodiment of the present invention.

With particular reference to FIG. 1, there is provided a vehicle 800 comprising a holder arrangement 1 holding a cable 3 or the like, attached to a support structure 5 within the vehicle 800, according to one example of the present invention. The vehicle 800 depicted in FIG. 1 is a truck 800 having an engine 100 for which the inventive concept may be used with. However, the inventive concept may as well be used in another vehicle, such as e.g. in a bus or in a working machine, or in another application such as e.g. in any industry where cabling and routing are needed.

Figure 2A:
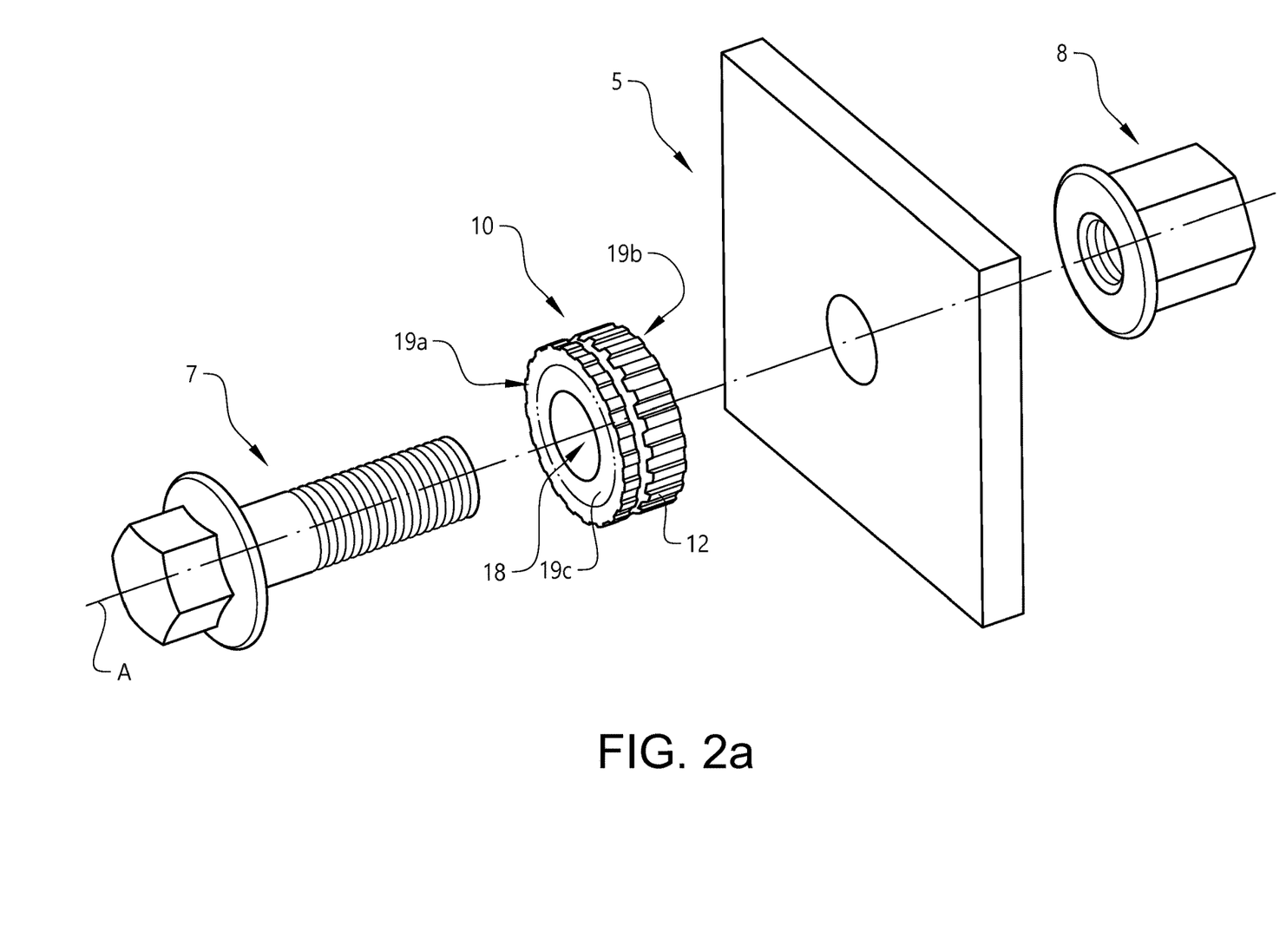
FIGS. 2A and 2B are exploded perspective views of the holder arrangement comprising a bracket and a spacer according to an example embodiment of the present invention.
Figure 2B:
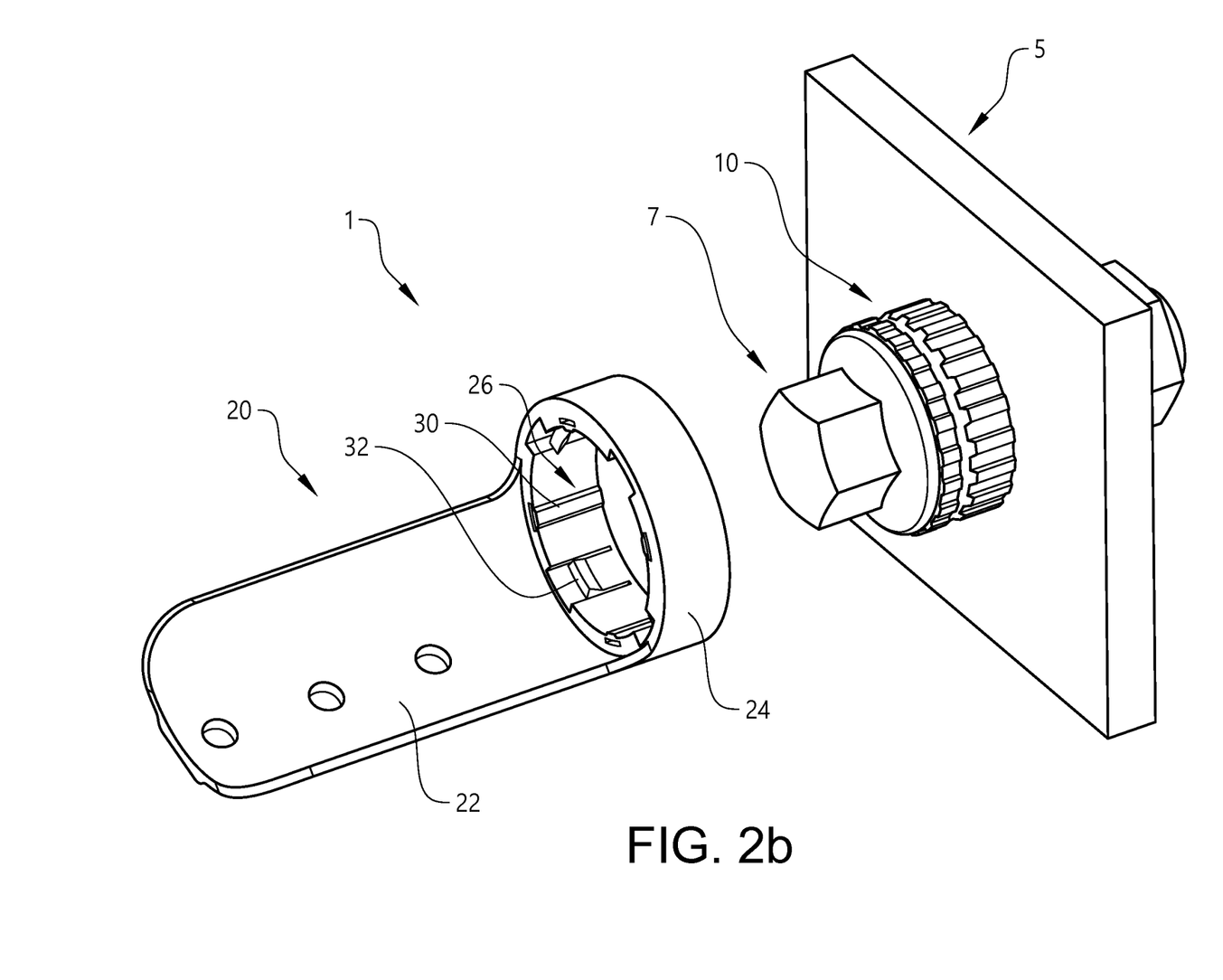
Figure 3:
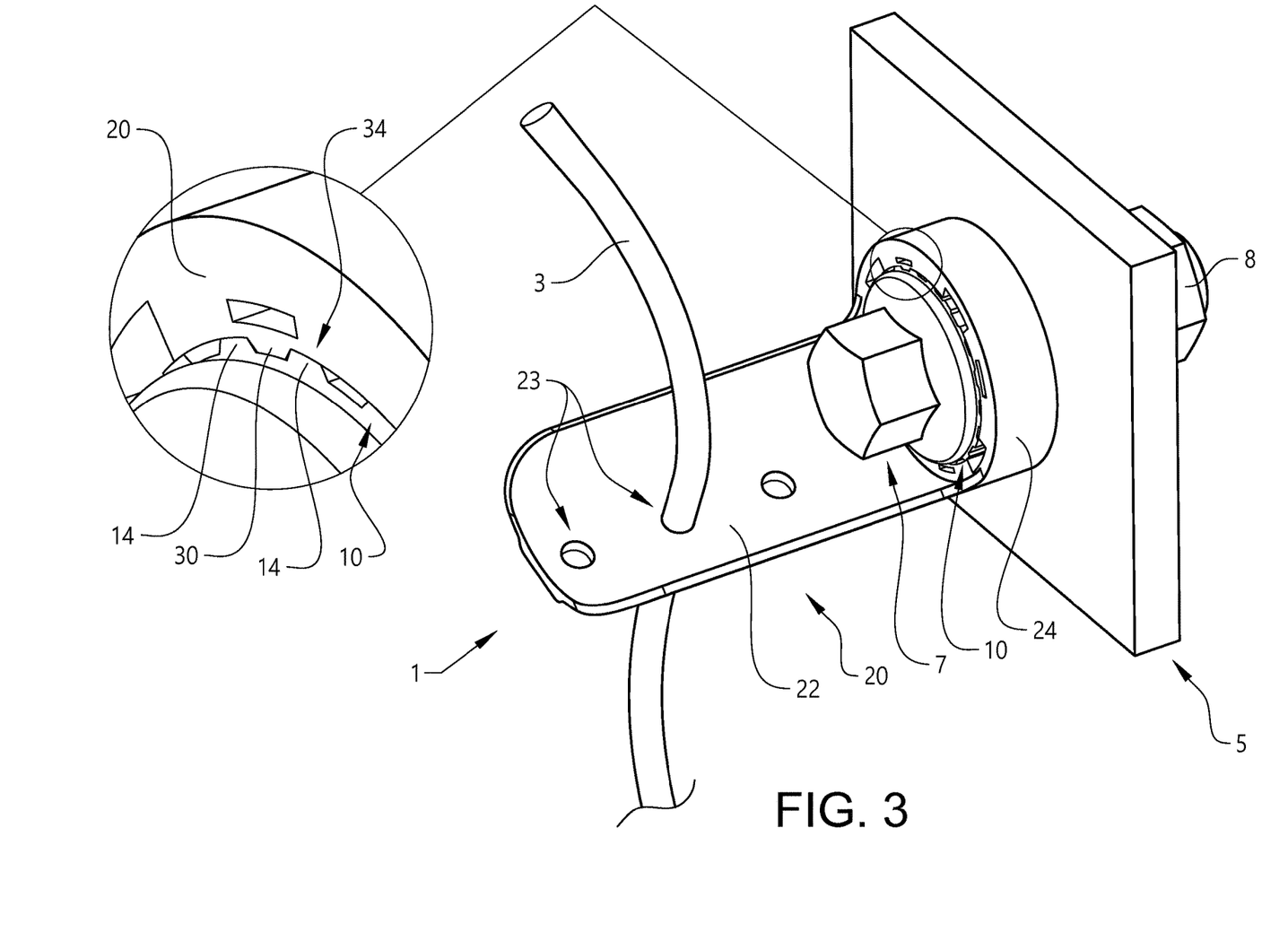
FIG. 3 is a perspective view of the holder arrangement of FIG. 2B when being attached to a support structure portion, according to an example embodiment of the present invention.
Figure 4:
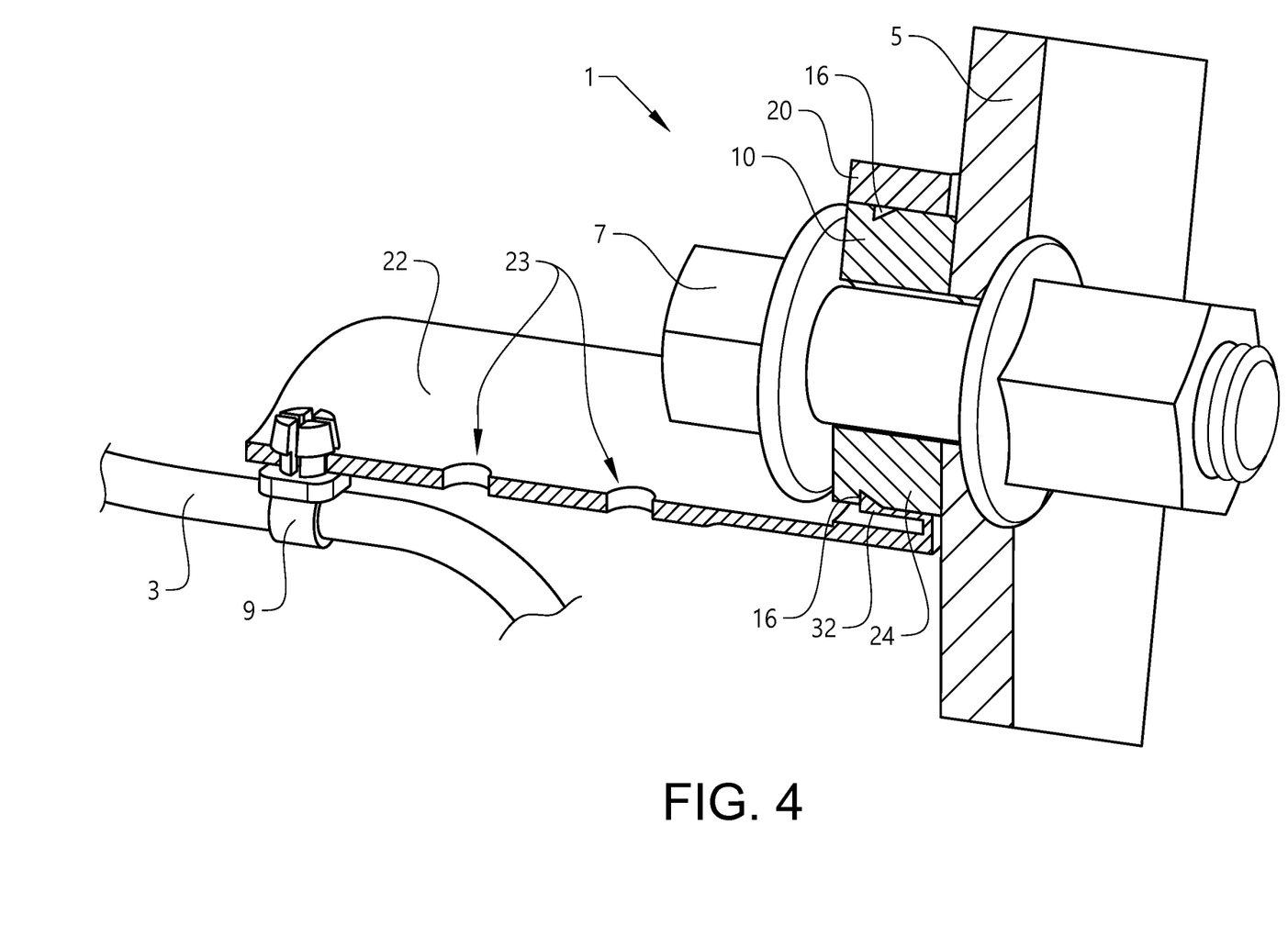
FIG. 4 is perspective view of the holder arrangement of FIG. 3, according to an example embodiment of the present invention.
Figure 5:
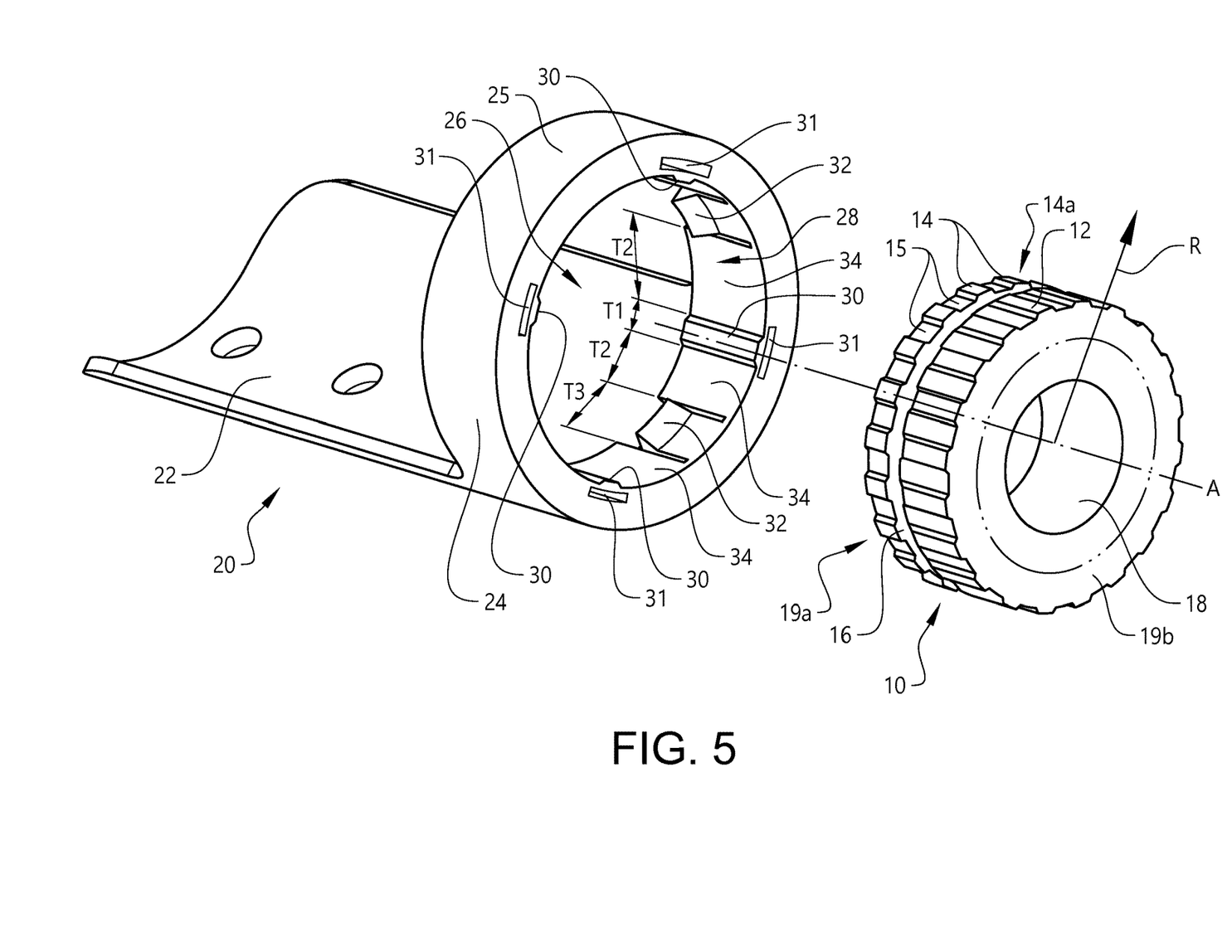
FIG. 5 is an exploded perspective view of a bracket and a spacer, according to an example embodiment of the present invention.

A general concept of the holder arrangement 1 of the invention will now be described in the non-limiting example of FIGS. 2A and 2B showing perspective, partly exploded, views of the holder arrangement 1 and its comprised spacer 10 and bracket 20, together with FIGS. 3 and 4 showing different perspective views of the holder arrangement 1 and FIG. 5 showing an enlarged perspective view of the bracket 20 and the spacer 10.

The holder arrangement 1 comprises a spacer 10 being configured for attachment to the support structure 5 by a fastener 7, and a bracket 20 comprising a cable supporting portion 22 configured to support a cable 3 (shown in FIGS. 3 and 4). The bracket 20 further comprises a spacer receiving portion 24 having a spacer receiving volume 26 for holding the spacer 10. Moreover, the spacer 10 comprises a spacer through hole 18 configured for receiving the fastener 7, such as e.g. the elongated body of a bolt 7, for attachment to the support structure 5. As also seen in FIG. 2B, the spacer receiving volume 26 of the spacer receiving portion 24 is a through hole 26 enabling access to the spacer 10, and thus also the fastener 7, when the spacer 10 is received in the spacer receiving volume 26. In FIG. 2A, the attachment of the spacer 10 to the support structure 5 by means of the fastener 7, and a bolt 8 is shown, and in FIG. 2B, attachment of the bracket 20 to the pre-attached spacer 10 is shown. However, it should be noted that the spacer 10 and the bracket 20 can be pre-assembled before attaching the holder arrangement 1 to the support structure 5 by the fastener 7.

In FIGS. 3 and 4, the spacer 10 is shown as received in the spacer receiving volume 26 and is attached to the support structure 5 by means of the fastener 7 which is extending through the spacer through hole 18 and penetrates the support structure 5 to connect to the bolt 8. Moreover, the cable supporting portion 22 of the bracket 20 supports the cable 3 such that the cable is held, or is supported, in relation to the support structure 5. The cable supporting portion 22 is shaped as an elongated portion 22 extending from the spacer receiving portion 24, and comprises a plurality of holes 23 wherein at least one of such holes 23 is used for holding the cable 3, as seen in FIG. 4, or is used to hold an attachment structure which in turn, holds the cable 3.

As best shown in FIG. 2A and FIG. 5, the spacer 10 has a uniform extension along the axial direction A of the spacer 10 and is cylindrically shaped. That is, the spacer 10 has first side 19A being flat and extending in the radial direction of the spacer 10, and a second side 19B being flat and extending in the radial direction of the spacer 10, the second side 19B being axially spaced to the first side 19A. The spacer 10 further comprises an outer wall 12, here being a lateral outer wall 12, extending between the first side 19A and the second side 19B. The first side 19A may be referred to as a top side 19A or a the top portion 19A of the spacer 10, the second side 19B may be referred to as a bottom side 19B or a bottom portion 19B of the spacer 10. Here, the bottom side/portion 19B is referring to a side facing towards the support structure 5 when the holding arrangement 1 is attached to the support structure 5, and the top side/portion 19A is referring to a side facing in the opposite direction compared to the bottom side/portion 19B.

Moreover, at least a portion of the first side 19A is a fastener contacting surface 19C (shown in FIG. 2A) which, in use, is configured as a counter holding surface for the fastener 7, such as e.g. the bolt head of a bolt 7. The fastener contacting surface 19C has a smaller radial extension compared to a radial extension of the spacer receiving volume 26, such that the bracket 20 can be attached to the spacer 10 subsequently to fastening the spacer 10 to the support structure 5 by means of the fastener 7.

More specifically, and as shown best in FIG. 5, the spacer receiving portion 24 of the bracket 20 is cylindrically formed, and comprises a cylindrical bracket wall 25. The cylindrical bracket wall 25 surrounds the spacer receiving volume 26. An inner wall 28 of the cylindrical bracket wall 25 faces the spacer receiving volume 26, and as is shown in both FIG. 2B and FIG. 5, the spacer receiving volume 26 is formed as a through hole 26 in the spacer receiving portion 24. The inner wall 28 is provided with a bracket rotational locking arrangement 30, here in the form of axial bracket ridges 30, and a bracket axial locking arrangement 32, here in the form of protrusions 32 of the inner wall 28. It should be noted that only one protrusion 32 may be sufficient for the bracket axial locking arrangement 32. Moreover, the inner wall 28 is provided with a bracket load transferring surface 34 being distant from the axial bracket ridges 30 and the protrusions 32. The axial bracket ridges 30 is arranged in the inner wall 28 along an axial axis A, i.e. in the axial direction of the inner wall 28, over four separate portions of the circumference of the inner wall 28. Hence the axial bracket ridges 30 are repeatedly and alternately arranged along the circumference of the inner wall 28. The axial bracket ridges 30 may be referred to as bracket threads 30 or bracket teeth 30. It should also be noted that each of the axial bracket ridges 30 may be divided into several axial bracket ridges, i.e. in FIG. 5, each one of the four separate portions of the circumference of the inner wall 28 comprising the bracket rotational locking arrangement 30, may be comprised of at least two or more axial bracket ridges.

In more detail, the inner wall 28 of the cylindrical bracket wall 25 is circumferentially divided between a first wall portion type T1 comprising an axial bracket ridge 30, a second wall portion type T2 comprising at least a portion of the bracket load transferring surface 34, and third wall portion type T3 comprising a protrusion 32. As shown in FIG. 3, at least the first and second wall portion types T1, T2, are alternately and repeatedly arranged along the entire circumference of the inner wall 28. The third wall portion type T3 may be present in at least one portion of the inner wall 28, but also as shown in FIG. 5, in at least two portions of the inner wall 28. As an alternative embodiment, the second wall type T2 may be more common than each one of the first wall type T1 and the third wall type T3, as e.g. the first wall type T1 may be surrounded by the second wall type T2. Such configuration provides a large bracket load transferring surface area.

Correspondingly, the spacer 10 comprises an outer wall 12 being provided with corresponding spacer rotational locking arrangement 14, here in the form of axial spacer ridges 14, and corresponding spacer axial locking arrangement 16, here in the form of a circumferentially arranged groove 16. The axial spacer ridges 14 is in FIG. 5 arranged in the outer wall 12 in the axial direction, i.e. along the axial axis A, of the spacer 10 over the entire outer circumference of the spacer 10. Hence the axial spacer ridges 14 are repeatedly and alternately arranged along the entire circumference of the outer wall 12. The axial spacer ridges 14 may be referred to as spacer threads 14 or spacer teeth 14. Moreover, as seen in FIG. 5 the circumferentially arranged groove 16 is arranged in the outer wall 12 along the whole outer circumference of the spacer 10. The circumferentially arranged groove 16 is in FIG. 5, arranged in the outer wall 12, being a lateral wall 12, somewhere between the first side 19A (i.e. the top portion 19A or top side 19A) of the spacer 10, and a second side 19B (i.e. the bottom portion 19B or bottom side 19B) of the spacer 10, but it should be mentioned that the circumferentially arranged groove 16 may be arranged further towards one of the first side 19A and the second side 19B, or even be comprised in the first side 19A or the second side 19B. As best shown in FIGS. 2A and 5, the circumferentially arranged groove 16 is arranged as an interruption of the axial spacer ridges 14, such that each axial spacer ridge is divided into at least two portions, one portion above, and one portion below, the circumferentially arranged groove 16.

Moreover, as shown in FIG. 5, the spacer receiving portion 24 is provided with a gap 31 or a through hole 31 adjacent, and arranged radially outwards of, each one of said axial bracket ridges 30. The gaps 31 or through holes 31 are typically shaped and dimensioned to receive and at least partly house a respective axial bracket ridge 30. Hereby, the axial bracket ridges 30 may be moved radially outwards towards, and into, the gaps 31 or through holes 31 upon the application of a certain threshold load, such as e.g. an intentional rotational force applied to the bracket 20 and made in order to intentional rotate the bracket 20 relative the spacer 10, even when the spacer 10 is received in said spacer receiving volume 26. Thus, the bracket 20 may be forcefully rotated even when the spacer 10 is received in said spacer receiving volume 26. Thus, by forcibly applying a force to rotate the bracket 20 in relation to the spacer 10, the axial bracket ridges 30 will deflect, into said gaps 31 or through holes 31, when encountering the axial spacer ridges 14 which is held in positon relative the support structure 5 by the fastener 7, and thus, the bracket 20 may be intentional rotated relative the spacer 10 and the support structure 5. That is, said bracket 20 can be rotationally positioned in relation to said support structure 5 even after assembly of the bracket 20 to the spacer 10.

It should be noted that the axial axis A of the bracket 20 and the axial axis A of the spacer 10 typically coincides, or are the same. Correspondingly, the radial axis R of the bracket 20 and the radial axis R of the spacer 10 are typically parallel to each other, or are the same or coincides when the spacer 10 is received in the spacer receiving volume 26.

Turning back to FIGS. 3 and 4, in which the spacer 10 is received in the spacer receiving volume 26, the bracket axial locking arrangement 32 mates with the spacer axial locking arrangement 16, i.e. the protrusion 32 is snap-locked into the circumferentially arranged groove 16, to axially lock the bracket 20 in relation to the spacer 10. Moreover, the bracket rotational locking arrangement 30 mates with the spacer rotational locking arrangement 14, as e.g. is shown in the enlargement in FIG. 3, an axial bracket ridge 30 mates with two axial spacer ridges 14, or rather an axial spacer groove 15, to rotationally lock the bracket 20 in relation to the spacer 10. Thus, the bracket 20 can be rotationally positioned in relation to the support structure 5 by means of the spacer 10. Moreover, in the assembled state shown in FIGS. 3 and 4, i.e. when the spacer 10 is received in the spacer receiving volume 26, the bracket load transferring surfaces 34 is in contact with the outer wall 12 of the spacer 10, or more specifically, in contact with the top portion of some of the axial spacer ridges 14, for transferring loads from the bracket 20 to the spacer 10. By transferring loads (e.g. forces or moments) via surfaces not providing for the axial or rotational locking, unintentional movement of the bracket 20 relative the spacer 10 can be avoided or the risk thereof at least be reduced. In other words, as the bracket rotational and axial locking arrangement (i.e. the protrusion 32 and the axial bracket ridges 30) are distant, and separated from the bracket load transferring surfaces 34, load (e.g. forces and moments) may be transferred between the bracket 20 and the spacer 10, such as between the inner wall portion 28 of the spacer receiving portion 24 and the outer wall 12 of the spacer 10, at least as a complement to load transfer via the rotational and axial locking arrangement.

As best shown in FIGS. 2A and 5, each one of the axial spacer ridges 14 has a flat top 14A enabling a relative large contact surface area with a bracket load transferring surface 34 of the bracket 20. However, it should be noted that not all, or none, of the axial spacer ridges 14 need to have a flat top 14A. Thus, according to at least one example embodiment, the axial spacer ridges, or at least some of the axial spacer ridges, have a top-shaped top.

Figure 6:
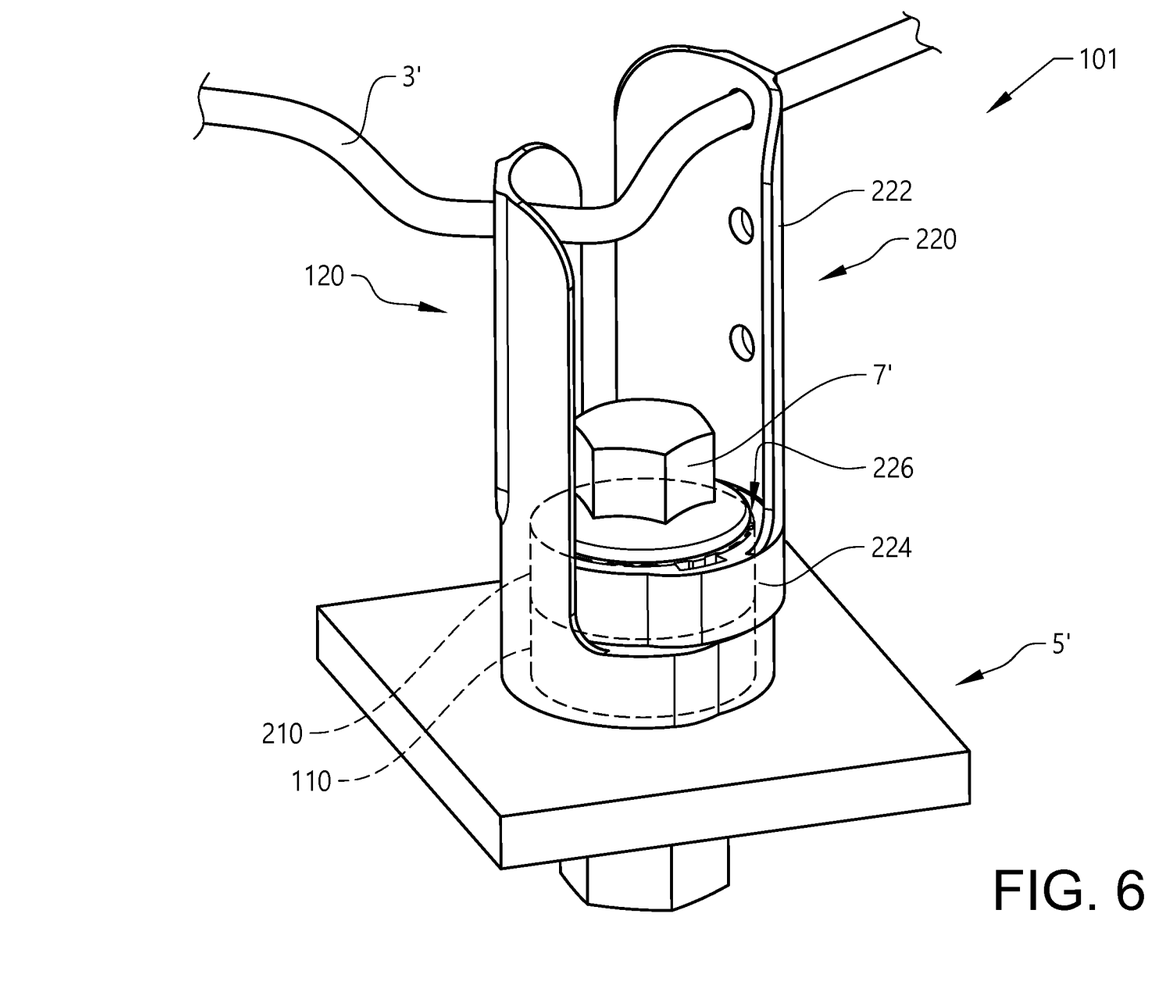
FIG. 6 is a perspective view of another holder arrangement comprising two brackets and two spacers, according to an example embodiment of the present invention.

In the non-limiting example of FIG. 6, an alternative holder arrangement 101 is shown. The holder arrangement 101 comprises a first spacer 110 being equal, or similar to, the spacer 10 of the holder arrangement 1 of FIGS. 2A-5, (thus, the same reference numerals for the spacer 10 are used for the first spacer 110, but with the addition of the number "100"), and a second spacer 210 being equal, or substantially equal, to the first spacer 110. Moreover, the holder arrangement 101 comprises a first bracket 120 being equal, or similar to, the bracket 20 of the holder arrangement 1 of FIGS. 2A-5 (thus, the same reference numerals for the bracket 20 are used for the first bracket 120, but with the addition of the number "100"), and a second bracket 220 having a cable supporting portion 222 configured to support a cable 3', and a spacer receiving portion 224 having a spacer receiving volume 226 for holding the second spacer 210, wherein the spacer receiving portion 224 of the second bracket 220 is equal, or substantially equal, to the spacer receiving portion 124 of the first bracket 120. Thus, the holder arrangement 101 of FIG. 5 is configured for attachment to a support structure 5' by a fastener 7' very similar to the holder arrangement 1 of FIGS. 2A-5. However, for the holding arrangement 101 of FIG. 5, the first and the second spacers 110, 210 are stacked on top of each other such that their respective spacer through holes align and thus enabling fastening of the first and the second spacers 110, 210 to the support structure 5' by the same fastener 7.

Figure 7:
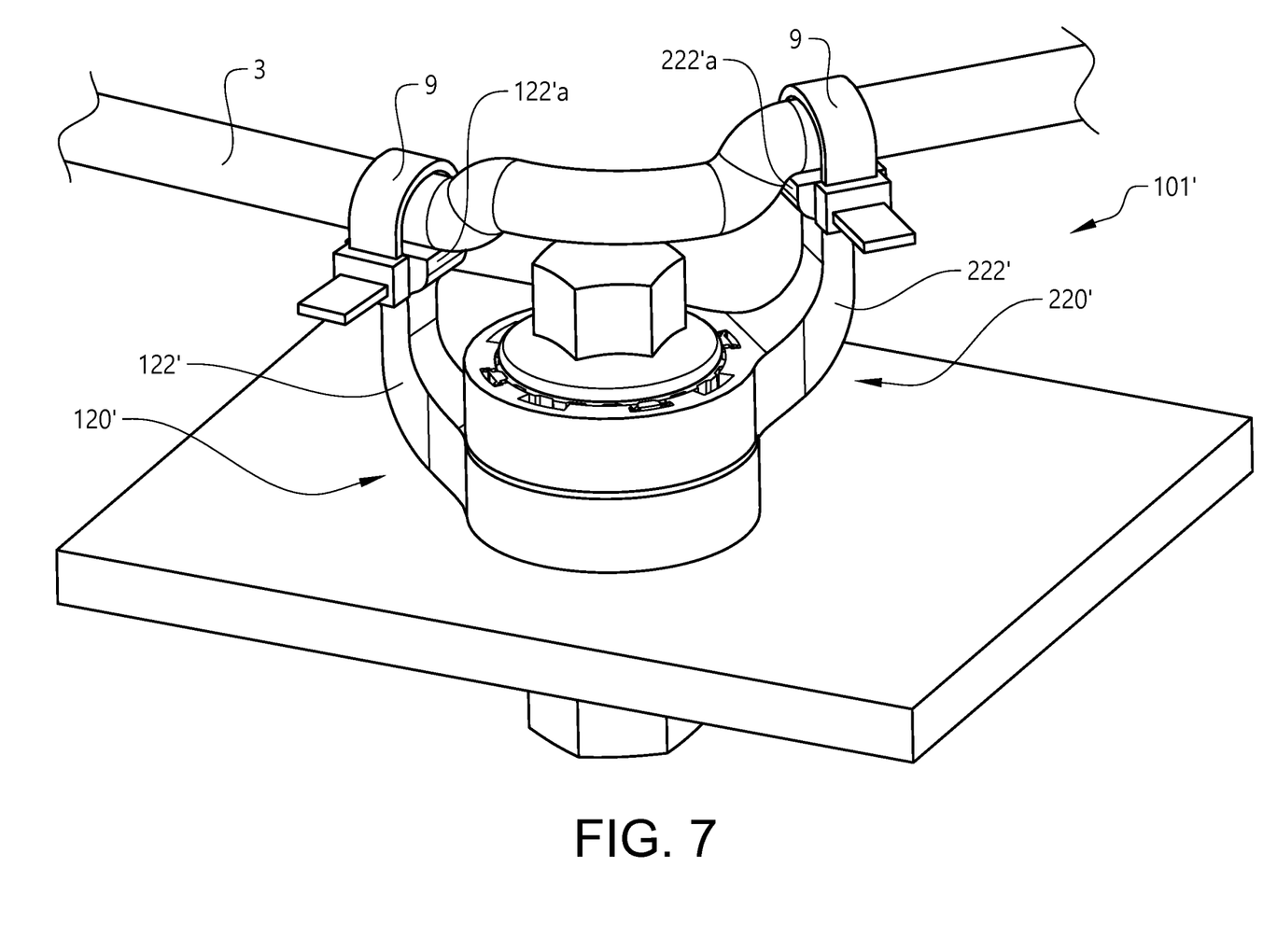
FIG. 7 is a perspective view of yet another holder arrangement comprising two brackets and two spacers, according to an example embodiment of the present invention.

In the non-limiting example of FIG. 7, an alternative holder arrangement 101' is shown. The holder arrangement 101' is very similar to the holder arrangement 101 of FIG. 6, but with the difference that the respective cable supporting portion 122', 222' of the first and second brackets 120', 220' respectively, is formed differently compared to the cable supporting portion 122, 222 of the holder arrangement 101 of FIG. 6. In FIG. 7, the respective cable supporting portion 122', 222' comprises an attachment structure 122'A, 222'A for receiving an attachment, such as e.g. a clamping stripe 9, which is used to hold and secure the cable 3.

Figure 8:
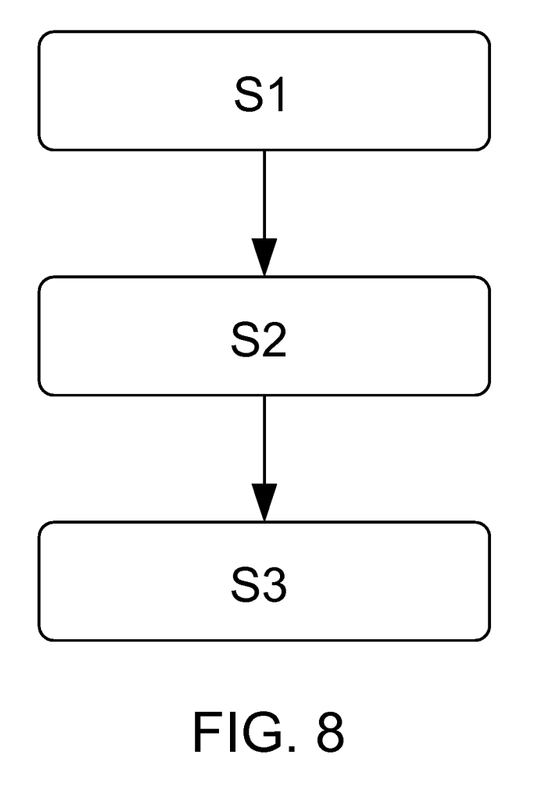
FIG. 8 is a flow chart describing the steps of a method for manufacturing a spacer according to an example embodiment of the invention.

The present invention also relates to a manufacturing method of a spacer, such as the spacer 10 of FIGS. 2A-5, or spacers 110, 210 of FIG. 6. Thus, the present invention will hereafter be described with reference to the above described holder arrangements 1, 101 and corresponding spacer 10, 110, 210 in a non-limiting way, with reference to the flow-chart in FIG. 8. Thus, the spacer manufactured by the method described with reference to FIG. 8 is configured for attachment to a support structure, and is configured for mating with a bracket such that the bracket can be rotationally positioned in relation to the support structure by means of the spacer. For example, the bracket axial locking arrangement 32 and a bracket rotational locking arrangement 30 may be arranged so that the spacer may be inserted into the bracket from either side. This may be achieved e.g. by having the bracket axial locking arrangement 32 and a bracket rotational locking arrangement 30 being centred in the axial direction and the protrusion 32 and corresponding groove 16 to have a profile which is square with or without rounded corners, sawtooth shaped, be rounded e.g. as a half-circle or as an acute triangle.

In a first step s1, the spacer is formed in an extrusion process into a cylindrical shape having an outer wall comprising axial spacer ridges arranged along an axial direction of the spacer. The axial spacer ridges is configured to mate with a corresponding axial bracket ridge of the bracket.

In a second step s2, a flat top is formed for at least one of the axial spacer ridges. Hereby, a relative large contact surface area with a bracket load transferring surface of the bracket is provided.

In a third step, s3, a circumferentially arranged groove is formed in the outer wall of the spacer. The circumferentially arranged groove is configured to mate with a corresponding snap-lock of the bracket.

It should be understood that the above steps s1-s3 may be carried out in such a way that spacer shown in FIGS. 2A-6, is manufactured.

It should be noted that the second step s2 and/or the third step s3, may be carried out by the extrusion process in the first step s1.

It should further be noted that the vehicle 800 if FIG. 1 may comprise the holder arrangement 1 of FIGS. 2A-5, or the holder arrangement 101 of FIG. 6, or the holder arrangement 101' of FIG. 7, and that the spacer comprised in such holder arrangement 1, 101, 101' may be manufactured by the method described in the flow-chart with reference to FIG. 8.

It is to be understood that the present invention is not limited to the embodiments described above and illustrated in the drawings; rather, the skilled person will recognize that many changes and modifications may be made within the scope of the appended claims.

The invention claimed is:

1. A holder arrangement for holding a cable to a support structure, said holder arrangement comprising:
   a spacer being configured for attachment to said support structure, and
   a bracket comprising a cable supporting portion configured to support the cable, and a spacer receiving portion having a spacer receiving volume for holding said spacer, said spacer receiving portion comprising an inner wall facing said spacer receiving volume and is provided with a bracket axial locking arrangement and a bracket rotational locking arrangement,
   wherein said spacer comprises an outer wall being provided with corresponding spacer axial locking arrangement and spacer rotational locking arrangement, and wherein when said spacer is received in said spacer receiving volume, said bracket axial locking arrangement is configured to mate with said spacer axial locking arrangement to axially lock said bracket in relation to said spacer, and said bracket rotational locking arrangement is configured to mate with said spacer rotational locking arrangement to rotationally lock said bracket in relation to said spacer, such that said bracket can be rotationally positioned in relation to said support structure by means of said spacer,
   wherein said internal wall further comprises a bracket load transferring surface being distant from said bracket rotational locking arrangement, wherein when said spacer is received in said spacer receiving volume, said bracket load transferring surface is in contact with the outer wall of said spacer for transferring loads from said bracket to said spacer to avoid, or reduce, unintentional movement of said bracket relative said spacer.

2. A holder arrangement according to claim 1, wherein said spacer rotational locking arrangement comprises axial spacer ridges arranged along an axial direction of the spacer, and said bracket rotational locking arrangement comprises at least one axial bracket ridge adapted to mate with said axial spacer ridges.

3. A holder arrangement according to claim 2, wherein at least one of said axial spacer ridges have a flat top, enabling a relative large contact surface area with said bracket load transferring surface.

4. A holder arrangement according to claim 1, wherein said spacer axial locking arrangement comprises a circumferentially arranged groove, and said bracket axial locking arrangement comprises a protrusion adapted to be snap-locked into said circumferentially arranged groove.

5. A holder arrangement according to claim 1, wherein said inner wall of said spacer receiving portion is circumferentially divided between a first wall portion type comprising said bracket rotational locking arrangement, and a second wall portion type comprising said bracket load transferring surface, and wherein said first and second wall portion types are alternately and repeatedly arranged along the entire circumference of the inner wall.

6. A holder arrangement according to claim 1, wherein said spacer has a uniform extension along the axial direction of the spacer, e.g. by being cylindrically shaped.

7. A holder arrangement according to claim 1, wherein said spacer is manufactured by an extrusion process.

8. A holder according to claim 1, wherein at least said spacer receiving portion is made out of plastic.

9. A holder arrangement according to claim 1, wherein said spacer comprises a spacer through hole configured for receiving a fastener, such as e.g. the elongated body of a bolt, for attachment to said support structure, and wherein said spacer receiving volume of said spacer receiving portion is a through hole enabling access to said spacer when said spacer is received in said spacer receiving volume.

10. A holder arrangement according to claim 9, wherein said spacer further comprises a first side perpendicularly arranged to said spacer through hole, said first side having a fastener contacting surface which, in use, is configured as a counter holding surface for said fastener, such as e.g. the bolt head of a bolt, wherein said fastener contacting surface has a smaller radial extension compared to a radial extension of said spacer receiving volume, such that the bracket can be attached to said spacer, subsequently to fastening said spacer to said support structure by means of said fastener.

11. A holder arrangement according to claim 9, wherein said spacer is a first spacer and said bracket is a first bracket, and said holder arrangement further comprises:
   a second spacer configured for attachment to said support structure, said second spacer being equal, or substantially equal, to said first spacer, and
   a second bracket having a cable supporting portion configured to support a cable, and a spacer receiving portion having a spacer receiving volume for holding said second spacer, said spacer receiving portion of said second bracket being equal, or substantially equal, to the spacer receiving portion of said first bracket,
   wherein, in use, the first and the second spacers can be stacked on top of each other such that the spacer through holes align and thus enabling fastening of the first and the second spacers to the support structure by the same fastener.

12. A vehicle comprising a support structure, and a holder arrangement according to claim 1.

13. A method for manufacturing a spacer being configured for attachment to a support structure, and being configured for mating with a bracket such that said bracket can be rotationally positioned in relation to said support structure by means of said spacer, said method comprising the steps of:
   forming said spacer in an extrusion process into a cylindrical shape having an outer wall comprising axial spacer ridges arranged along an axial direction of the spacer, said axial spacer ridges being configured to mate with a corresponding axial bracket ridge of said bracket.

14. A method according to claim 13, further comprising the step of:
   forming a flat top of at least one of the axial spacer ridges enabling a relative large contact surface area with a bracket load transferring surface of said bracket.

15. A method according to claim 14, further comprising the step of:
   forming a circumferentially arranged groove in said outer wall, said circumferentially arranged groove being configured to mate with a corresponding snap-lock of said bracket.

* * * * *